INVENTORS
Ivan A. Nichols
Alan S. Anderson
By Roberts, Cushman & Grover,
ATT'YS.

United States Patent Office 3,441,348
Patented Apr. 29, 1969

3,441,348
ENERGY CONCENTRATING AND SIGHTING DEVICE FOR RADIOMETRIC APPARATUS
Ivan A. Nichols, Ipswich, and Alan S. Anderson, Cochituate, Mass., assignors to Williamson Development Co., Inc., West Concord, Mass., a corporation of Massachusetts
Continuation of application Ser. No. 374,999, June 15, 1964. This application Feb. 20, 1968, Ser. No. 706,994
Int. Cl. G01j 5/48; G01n 21/00
U.S. Cl. 356—43                                    10 Claims

ABSTRACT OF THE DISCLOSURE

A sighting device for radiometric instruments, such as for temperature measurement of a distant object, has a flat mask sharply defining an aiming pattern. On one side of the mask is an aiming light at a distance accommodating a collector system. On the other side of the mask is a variable focus projecting lens system, and a sensing element at the mask. The transparent mask portions preferably define a parentheses pattern whose inner circle is coextensive with a round sensor face, or whose opposite parentheses edges are distanced to indicate the width of a sensor such as of rectangular configuration.

---

This application is a continuation of application Ser. No. 374,999, filed June 15, 1964, now abandoned.

The field of the present invention is that of sighting apparatus for incorporation in radiometric instruments, more particularly of the type suited for temperature measurement of a distance object or area and therefore requiring correlation of the instrument with the location and size of the measured source of energy.

While various devices of this type have been proposed, they are rather complicated or unreliable and ill-suited for incorporation in lightweight, completely portable instruments of this type, or in especially compact instruments.

Objects of the present invention are to provide an aiming or sighting arrangement of the above type which can be conveniently incorporated in radiometric apparatus without in any way impairing its function or complicating its construction; to provide such an accessory arrangement for radiometers which permits aiming at areas to be measured at considerable distance such as up to 30 feet or more as well as determining the source area which will be measured at a given distance therefrom, in relation to the effective area of the sensing element used for measuring; to provide such a device which requires little power such that it can be operated from readily available batteries; to provide such a device which is of minimal weight so that it will not appreciably add to the weight of versatile, portable radiometric apparatus in which it is incorporated and which is designed for minimal weight and bulk; and to provide arrangements of this type which are rugged, simple and inexpensive, and yet very reliable in operation, even by untrained operators.

The substance and nature of the invention can be summarized as contemplating within a radiometric device, the combination of an aiming light, of a sensing element, of an aiming mask means, and of a projecting lens which serves the double purpose of projecting out the mask means and the sensing element with light from the aiming light and for projecting radiant energy from the area to be measured towards the sensing element. In a preferred embodiment, the mask means is an aperture pattern of significant outline cut into a sheet which supports the sensing element and transmits light from the aiming light towards the projecting lens and an image surface therebeyond. A concentrating lens is preferably placed between the auxiliary aiming light source and the mask means, directly in front of the latter, with the sensing element fastened on the other side in an easily recognizable dimensional relationship to the mask pattern. In this practical embodiment the sensing element and the mask pattern are practically in the same plane, and the pattern is uniformly illuminated. The mask pattern is symmetrical and in optical alignment with the complete lens system, the auxiliary light source, and the sensing element such as a photocell. By means of the preferably adjustable projecting lens system the mask pattern is imaged on a selected target surface; by means of this image the area to be measured can be directly or indirectly compared with the sensing element.

These and other objects and aspects of novelty of the invention will appear from the following description of a typical embodiment with two modes of correlating sensing element and mask pattern, illustrating its novel characteristics.

The description refers to the accompanying drawing in which

Figure 1:
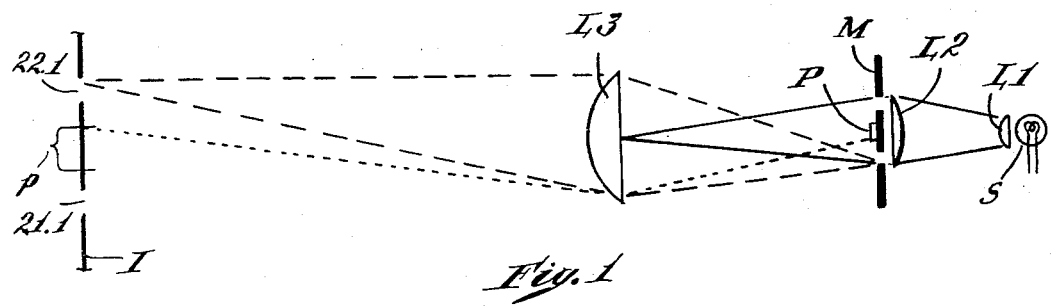
FIG. 1 is a schematic diagram of the optical principle according to the invention.
Figure 2:
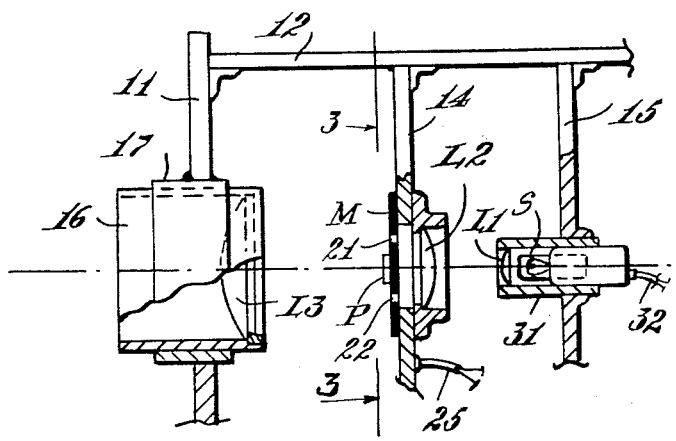
FIG. 2 is a view with a side wall removed and partly in axial section, of the pertinent portion of a pyrometric instrument incorporating the present invention.

In FIGS. 1 and 2, S denotes the sighting or aiming lamp, L1 and L2 constitute a condenser lens system and L3 is a projection lens or lens system. Depending on the light source S, lens L1 might be dispensed with if L2 can otherwise be completely illuminated, L1 having the purpose of better utilizing the light output from S. In devices involving the measurement of infrared energy, L3 will be a quartz lens. The focal length of the collector L2 is selected to focus L1, or S if L1 is not used, on the projection lens L3. Directly in front of the collector L2 is a mask M which will be described in detail hereinbelow, and a sensing element P facing lens L3. It will be understood that as in any conventional projection system the purpose of lens L2 is to provide even illumination through the entire mask area. The focal length of L3 is so selected that it will image the mask M at a convenient distance, depending on the proposed use of the instrument. The distance of L3 from M is preferably adjustable to permit imaging of M on a surface at least approximately at the distance from which the actual measurement will be taken.

Referring now to FIG. 2, 11 is the front panel of a pyrometric instrument incorporating the invention, 12 is its top panel, and 14 and 15 are internal partitions. It will be understood that FIG. 2 is schematical and that any suitable housing or chassis can be used so long as the various components are accommodated. Mounted on the front panel 11 is the projection lens mount 16 with the lens L3. Any suitable focusing arrangement can be used. FIG. 2 indicates a smooth barrel 17 wherein mount 16 slides, but a helical or rack and pinion movement might be used.

Figures 3, 4, 5:
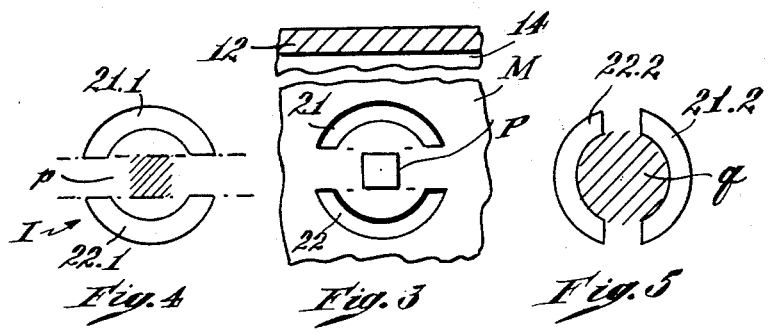
FIG. 3 is a section on line 3—3 of FIG. 2 showing the mask pattern and sensing element area.
FIG. 4 illustrates the image projected by a device according to the invention and the correlation of a mask and sensing element arrangement according to FIG. 3.
FIG. 5 is a projected image of differently correlated mask and sensing element components.

The panel 14 has an aperture covered on one side by the collector lens L2 and on the other side by the mask sheet M with openings forming a pattern such as for example shown at 21 and 22 of FIG. 3. Fastened to the mask sheet M is a photoelectric sensor P such as for example a lead sulfide cell sensitive to infrared energy. The leads from the sensor P are in some convenient manner brought out as indicated at 25.

The wall 15 supports a lamp mount 31 which holds the aiming lamp S and the collecting lens L1. Lamp supply wires are indicated at 32, preferably leading to a battery within the housing.

The mask aperture pattern is preferably symmetrical to the optical axis such as indicated in FIG. 3, and it has a definite relation as to dimensions and shape, to the effective radiation sensitive surface of the cell P. For example, as indicated in FIG. 3, the sides of a square cell correspond to the distance of the two parenthesis shaped openings 21, 22, for the following purpose.

The lens L3 can be adjusted to image the mask pattern, illuminated through L1 and L2, at any convenient distance. The projected image of the pattern according to FIG. 3 is indicated in FIGS. 1 and 4 where 21.1 and 22.1 represent the bright traces of the mask openings 21, 22 on a surface such as wall or screen I. This surface may or may not contain the radiating area to be measured. The cross hatched area $p$ will then correspond in size and location to the cell P and since the mask openings and the cell are in definite dimensional relation to each other, the area $p$ can be easily supplied from the projected image of the mask. Different relations are possible as for instance indicated in FIG. 5 which is the projected image of a mask system wherein the parenthesis shaped mask openings are vertically arranged and the effective area of the photocell fills the entire field within the mask openings, as indicated at $q$ between 21.2 and 22.2.

It will be noted that the above described embodiment of my invention has the particular advantage that both the mask apertures and the sensor are in the same plane so that there is no necessity for devices such as the aligning mirrors or split optics of previous sighting systems. The sensor and the mask openings are in fixed relationship to each other and it is therefore very easy to determine what portion of a target will be measured by observing where the lighted areas are on the target itself or on a comparison image surface.

It will be understood that mask and sensor can be independently mounted on any convenient supporting structure and that the apertured sheet can be replaced by a pattern applied to glass or other transmitting material, with some slight loss of energy.

In operating an energy measuring device such as a pyrometer, which incorporates the present invention, the instrument is aimed at a wall or other suitable surface, the lamp S is energized such as by closing a push-button switch in the battery circuit feeding the lamp, and a sharp image of the mask is obtained by adjusting the lens L3. The area to be measured should then at least fully cover the projected sensor shape $p$, easily detectable by means of the mask image configuration, as above explained. The measured area of course depends on the distance between image plane and instrument. For example the area measured might be one-half inch in diameter and one foot from the lens L3, or two inches in diameter at two and one-half feet from that lens, and proportionately larger at greater distances. In order to make accurate measurements, the effective sensor area must be filled by the projected area of the source to be measured, or, by virtue of optical reciprocity, the projected sensor area must be filled by the area to be measured.

If the target area, that is the area to be measured does not fill the field of view, that is the projected area of the effective sensor surface such as $p$ or $q$, the measurement will be inaccurate with instruments of this general type.

After ascertaining that the area to be measured is at least as large as the projected sensor area, the instrument is aimed at the surface to be measured, unless the latter has been directly correlated with the projected image when the reading can be made forthwith.

The aiming light can have a comparatively low energy output, for example it may be a type GE–222 flashlight bulb.

Readings should only be taken when the sighting light is extinguished, because the latter might be reflected back into the instrument thus causing it to indicate a temperature higher than the actual surface temperature. In order to limit such an unwanted response of the measuring instrument of the aiming light, a heat filter can be interposed between the aiming light and the mask. Also, the aiming light should be turned off during temperature reading in order to obtain the true target temperature.

As indicated above, it will in many instances be possible to use a comparatively large surface whose emissivity or reflectivity is to be measured (say a web or container wall) directly as the aiming image plane I, whereas in other instances an adjacent auxiliary comparison surface will be used.

If the projected sensor area such as $p$ is smaller than the emitting source area, the measurement will be accurate but the emitted energy not fully utilized by P. On the other hand, as mentioned above, if P is larger than the measured area corresponding to $p$, the measurement will be unreliable.

Although the herein described parentheses pattern was found to be peculiarly practical, it will be understood that other transparent or translucent pattern configurations can be used so long as they provide easy correlation of aiming pattern and sensor area.

It will also be understood that focusing adjustment of the projecting lens, while convenient, is not absolutely necessary and that fixed focus arrangements are suitable for certain purposes. Also, special fit over or exchange lenses can be used in accordance with well known optical principles for measuring especially small areas or at short distances.

It should be understood that the present disclosure is for the purpose of illustration only and that this invention includes all modifications and equivalents which fall within the scope of the appended claims.

We claim:
1. A device for aiming, at an area to be measured, radiometers which incorporate a sensing element and for concentrating energy from the area on the sensing element; comprising:
   an aiming light;
   projecting lens means aligned with said light and having focusing means for adjusting its distance from said light;
   a mask body optically aligned with said projecting lens means having a transmitting pattern which is larger than said sensing element, arranged between said light and said projecting lens means to accommodate collector means for the aiming light; and
   means for supporting said sensing element at said mask body and in optical alignment with said light, said transmitting pattern, and said projecting lens means, for conjugated imaging by the lens means of the sensing element and the transmitting pattern, and the area to be measured, respectively;
   whereby the image of the transmitting pattern indicates the relation thereto of the sensing element and both can be projected by the projecting lens means to compare the area to be measured with the effective area of the sensing element, and energy from the area to be measured can be projected by the projecting lens means onto the sensing element.

2. Device according to claim 1, wherein said supporting means locates said mask and the effective face of the sensing means approximately in a common plane.

3. Device according to claim 1, wherein said transmitting pattern has the approximate shape of a ring with two diametrically opposed non-transmitting sections, the transmitting pattern resembling two opposed parentheses.

4. Device according to claim 3, wherein said sensing element has a square effective face, two opposite edges of which are aligned with the edges of said non-transmitting sections.

5. Device according to claim 3, wherein said sensing element has a circular effective surface which is approximately coextensive with the space within said ring.

6. Device according to claim 1, wherein said mask body and said supporting means form a unitary sheet into which said pattern is cut, and onto which the sensing element is fastened at the central portion of the sheet.

7. Device according to claim 1 further comprising a collector lens means arranged between said aiming light and said mask body.

8. An aiming device for radiometers comprising:
mask means defining an essentially two dimensional transmitting pattern and having a center portion;
radiation sensing means attached to said mask means on a first side thereof and adjacent to the plane thereof;
an aiming light on the other side of said mask means; and
axially adjustable focusing lens means arranged on the first side of said mask means and optically aligned with said center, for projecting an image of said transmitting pattern as illuminated by said aiming light source, and for projecting radiation from an external source onto said sensing means;
whereby an area to be measured can be sighted by the image of the transmitting pattern as projected by the lens means to compare the size of the effective area of the sensing means with the area to be measured, and radiation to be measured can be projected by the lens means onto the sensing means.

9. Device according to claim 8, wherein said transmitting pattern has the shape of two diametrically opposed ring segments and the effective surface of the sensing means is a square whose sides are commensurate with said segments.

10. Device according to claim 8, wherein said transmitting pattern is approximately ring shaped with an inner area approximately coextensive with the effective area of said sensing means.

References Cited

UNITED STATES PATENTS 2,282,045   5/1942   Fleischer.
3,130,317   4/1964   Connelly et al.
3,151,248   9/1964   Glaser et al.

RONALD L. WIBERT, *Primary Examiner.*

WARREN A. SKLAR, *Assistant Examiner.*

U.S. Cl. X.R.

356—72